United States Patent [19]
Peterson, Jr.

[11] Patent Number: 5,645,135
[45] Date of Patent: Jul. 8, 1997

[54] INTERLOCK CIRCUIT FOR A WALK-BEHIND MOWER

[75] Inventor: Rudolph Andrew Peterson, Jr., Beaver Dam, Wis.

[73] Assignee: Deere & Company, Moline, Ill.

[21] Appl. No.: 594,739

[22] Filed: Jan. 31, 1996

[51] Int. Cl.⁶ .................................................. B60K 28/00
[52] U.S. Cl. ...................................... 180/272; 180/53.1
[58] Field of Search .................................. 180/271, 272, 180/273, 53.1

[56] References Cited

U.S. PATENT DOCUMENTS

| | | | |
|---|---|---|---|
| 3,266,032 | 8/1966 | Bühler | 180/272 |
| 3,942,604 | 3/1976 | Black, III | 180/272 |
| 4,580,455 | 4/1986 | Beugelsdyk et al. | 180/272 |
| 4,651,018 | 3/1987 | Peterson, Jr. | 307/10 SB |
| 4,974,711 | 12/1990 | Peterson, Jr. et al. | 192/12 D |
| 5,203,440 | 4/1993 | Peterson, Jr. et al. | 192/0.094 |
| 5,314,038 | 5/1994 | Peterson, Jr. et al. | 180/214 |

*Primary Examiner*—Kenneth R. Rice

[57] ABSTRACT

An interlock circuit includes key and PTO switches, at least one operator presence switch, and relays connected to a transmission switch to prevent engine starting and running unless the PTO is off, the transmission is in neutral and the key is on. Operator presence switch activation is unnecessary to start the engine but is required before PTO or transmission condition is changed to begin a vehicle operation such as cutting grass. Required start and run features of the interlock circuitry are met using simple circuits with readily available components and without modules. The circuitry can be used with pull start and electric start vehicles and is particularly useful with vehicles that have transmission clutches that lock engaged when the operator releases a bail.

15 Claims, 2 Drawing Sheets

INTERLOCK CIRCUIT FOR A WALK-BEHIND MOWER

BACKGROUND OF THE INVENTION

1) Field of the Invention

The present invention relates generally to commercial walk-behind mowers or similar vehicles with a transmission and PTO and, more specifically, to an interlock circuit for such vehicles.

2) Related Art

Currently available vehicles with key, transmission and PTO switches, such as wide area walk-behind mowers, have a transmission that automatically locks into neutral when the operator releases a bail located on the implement handle. Except during vehicle starting, the automatic locking into neutral feature eliminated need for a circuit that tied into the transmission neutral switch. There is a need to tie into the neutral switch, however, on models of similar vehicles that have a transmission clutch which is engaged while the bail is released to prevent vehicle movement when an operator is not present to hold the bail. In order to meet preselected requirements, such as no engine starting unless the PTO switch is off, the transmission is in neutral, and the key switch is on, a different interlock circuit is required than is available on vehicles with an automatic locking into neutral feature.

Some of the interlock circuits for walk-behind vehicles use commercially available electronic modules connected to switch structure on the vehicle. However, maintaining reliable module terminal connections is a continuing problem in the hostile operating environment, and terminal corrosion reduces the reliability of the circuits. Providing an interlock circuit that is simple, relatively inexpensive, and reliable and which uses components similar to those used in previous circuits to keep the number of parts to a minimum has been a problem. Providing an interlock circuit that can be used with pull start or electric start engines, or with engines where an electric start is added to the pull start so either can be used for starting, has also been a problem. Such a circuit must also permit continued running of the engine when the PTO and transmission are engaged when operator presence is indicated at a specific area on the vehicle.

BRIEF SUMMARY OF THE INVENTION

It is therefore an object of the present invention to provide an improved interlock circuit for a vehicle such as a commercial walk-behind mower. It is a further object to provide such an improved circuit that is particularly useful with a vehicle that has a bail and a transmission that does not lock in neutral when the bail is released. It is still another object to provide such a circuit which uses many of the same components as circuits for vehicles that lock in neutral when a bail is released.

It is a further object of the present invention to provide an improved interlock circuit for a vehicle which prevents engine starting or running unless a PTO switch is off, the transmission is in neutral, and a key switch is on. It is a further object to provide such a circuit which is simple, relatively inexpensive, and reliable and which uses components similar to those used in previously available interlock circuits to keep the number of parts to a minimum. It is still another object to provide such a circuit that does not require an electronic module so that module terminal problems are eliminated.

It is yet another object of the invention to provide improved interlock circuitry for a vehicle that can be used with both pull start or electric start engines.

Interlock circuitry constructed in accordance with the teachings of the present invention includes key and PTO switches, one or more operator presence switches, and relays connected to a transmission switch to prevent engine starting and running unless the PTO is off, the transmission is in neutral and the key is on. Operator presence switch activation is unnecessary to start the engine but is required before PTO or transmission condition is changed to begin a vehicle operation such as cutting grass. Required start and run features of the interlock circuitry are met using simple circuits with readily available components, and expensive modules with troublesome terminal connections are not required. The circuitry can be used with pull start and electric start vehicles and with pull start engines that have been converted by kit to electric start. The circuitry is particularly useful with vehicles that have transmission clutches that lock engaged when the operator releases the bail.

These and other objects, features and advantages of the present invention will become apparent to one skilled in the art upon reading the following detailed description in view of the drawings.

DETAILED DESCRIPTION OF THE DRAWINGS

Circuit for a Vehicle with Pull Start

Figure 1:
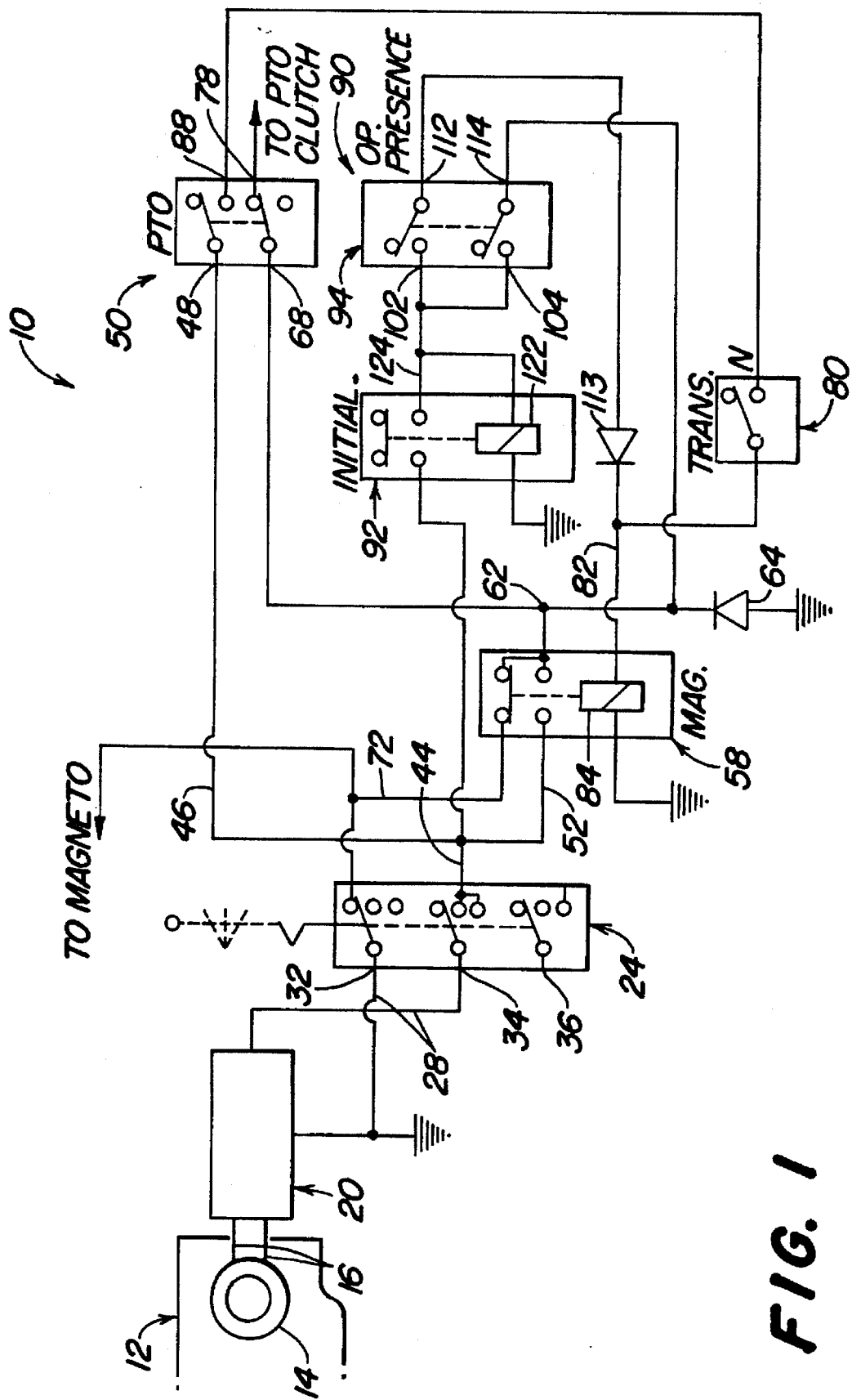
FIG. 1 is a schematic of an interlock circuit for a vehicle with a pull start.

Referring now to FIG. 1, therein is shown a circuit 10 for a vehicle such as a commercial walk-behind mower having an engine 12 with a magneto ignition and a source of electrical power 14. The source 14 is preferably an alternator having output leads 16 connected to a rectifier 20. A conventional key switch 24 is connected to the rectifier 20 and to ground via leads 28. The key switch 24 has an upper off position (shown), a central run position, and a lowermost start position. As shown in FIG. 1, the vehicle has a pull start without an electric start feature.

The key switch 24 has upper and central input terminals 32 and 34, respectively, connected to the leads 28. A lowermost terminal 36 remains open in the absence of the electric start feature. The upper input terminal 32 is connected to ground and grounds the magneto to prevent engine operation when the key switch is in the upper off position as shown in FIG. 1. The circuit from the magneto to ground is opened to facilitate engine operation when the key switch is moved from the off position.

The central input terminal 34 of the key switch 24 is open when the key switch is in the off position and is connected to an output terminal 44 when the switch is in either the run or start position. A lead 46 connects the terminal 44 to one input 48 of a PTO switch 50. A second lead 52 from the terminal 44 is connected to one of the switched terminals of a magneto or ignition relay 58. The opposite switched terminal of the relay 58 is connected to a lead 62 which is connected to a diode 64 and to a second input 68 of the PTO switch 50. The lead 62 is also connected to the second switched terminal of the magneto relay 58, and the corresponding input terminal of the relay 58 is connected via lead 72 to the magneto to ground the magneto through the diode 64 and prevent engine starting or running when the relay 58 is deactivated as shown in FIG. 1.

When the relay 58 is activated (in the down position) with the key switch 24 in either the start or run position, the lead 62 is connected to the power source lead 28 via lead 52, and power is supplied to the input 68 of the PTO switch. With the PTO switch 50 in the on position (as shown in FIG. 1), the lead 62 is connected to a switch output lead 78. The lead 78 is connected to the electrically operated PTO clutch which is engaged when the lead 78 is connected to the source of power.

A transmission switch 80 is connected between an activation coil lead 82 for coil 84 of the relay 58 and an output terminal 88 of the PTO switch. The switch 80 is open as shown in FIG. 1 when the transmission is engaged and is closed when the transmission is placed in neutral. When the PTO switch 50 is off (down so the lead 78 is unpowered) and the switch 80 is closed with the key switch 24 in either the on or start position, power is supplied to the activation coil 84 via terminals 48,88 and the switch 80 to activate the relay 58 and prevent magneto grounding so the engine can be started and run normally. When the PTO switch 50 is moved to the on or up position as shown in FIG. 1, the circuit is opened between the transmission switch 80 and the source of power. To prevent magneto grounding and engine kill when the PTO switch 50 is in the on position, an operator presence portion 90 of the circuit 10 is connected between the source of power and the lead 82 to maintain the magneto relay 58 activated, provided certain operating conditions are met.

The operator presence portion 90 includes an initialization relay 92 connected to the output lead 44 of the ignition switch 24 and to an operator presence switch 94 responsive to the position of the bail on the vehicle. When the bail is released, the vehicle transmission clutch locks engaged, and the switch 94 assumes the open position shown in FIG. 1. When the operator holds the bail, the switch 94 assumes a closed (down) position. The relay 92 is open when inactivated and provides a closed current path between the terminal 44 and input terminals 102 and 104 when activated. An output terminal 112 of the switch 94 is connected via a blocking diode 113 to the relay coil lead 82 to maintain activation of the relay 58 when the operator presence switch 94 is closed (bail held). The relay 92 includes an activation coil 122 connected between ground and a switched terminal output lead 124 so that once the initialization relay 92 is activated, the relay 92 is latched or bootstrapped to the on condition until the key switch 24 is moved to the off position or the engine is otherwise stopped to interrupt power to the output terminal 44. Power is supplied to the input terminal 68 of the PTO switch 50 via operator presence switch terminals 104,114 for PTO clutch activation through the switch 50 provided the operator presence switch 94 is closed.

In operation, to start the vehicle having the circuit 10 of FIG. 1, the operator turns the PTO switch to the off position and puts the transmission in neutral so that a closed current path is provided between the output terminal 44 and the coil lead 82 of the magneto relay 58. The key switch 24 is moved to the on position to power the terminal 44 and activate the magneto relay 58 when the engine is turned over using a pull start rope. With the engine running, the operator activates the operator presence switch 94 by assuming his working position relative to the vehicle. The switch 94 provides a current path via terminals 104,114 to activate the initialization relay 92 and bootstrap the relay to the on condition to provide power to the PTO switch clutch input terminal 68, provided the operator presence switch remains closed. To prevent engine kill when the operator presence switch 94 is open, the operator must move the transmission to neutral to close the transmission switch 80 and move the PTO switch 50 off (down) to maintain a closed current path through the PTO switch 50 and the transmission switch 80 to the activation coil 84 of the relay 58.

Circuit for a Vehicle with Electric Start

Figure 2:
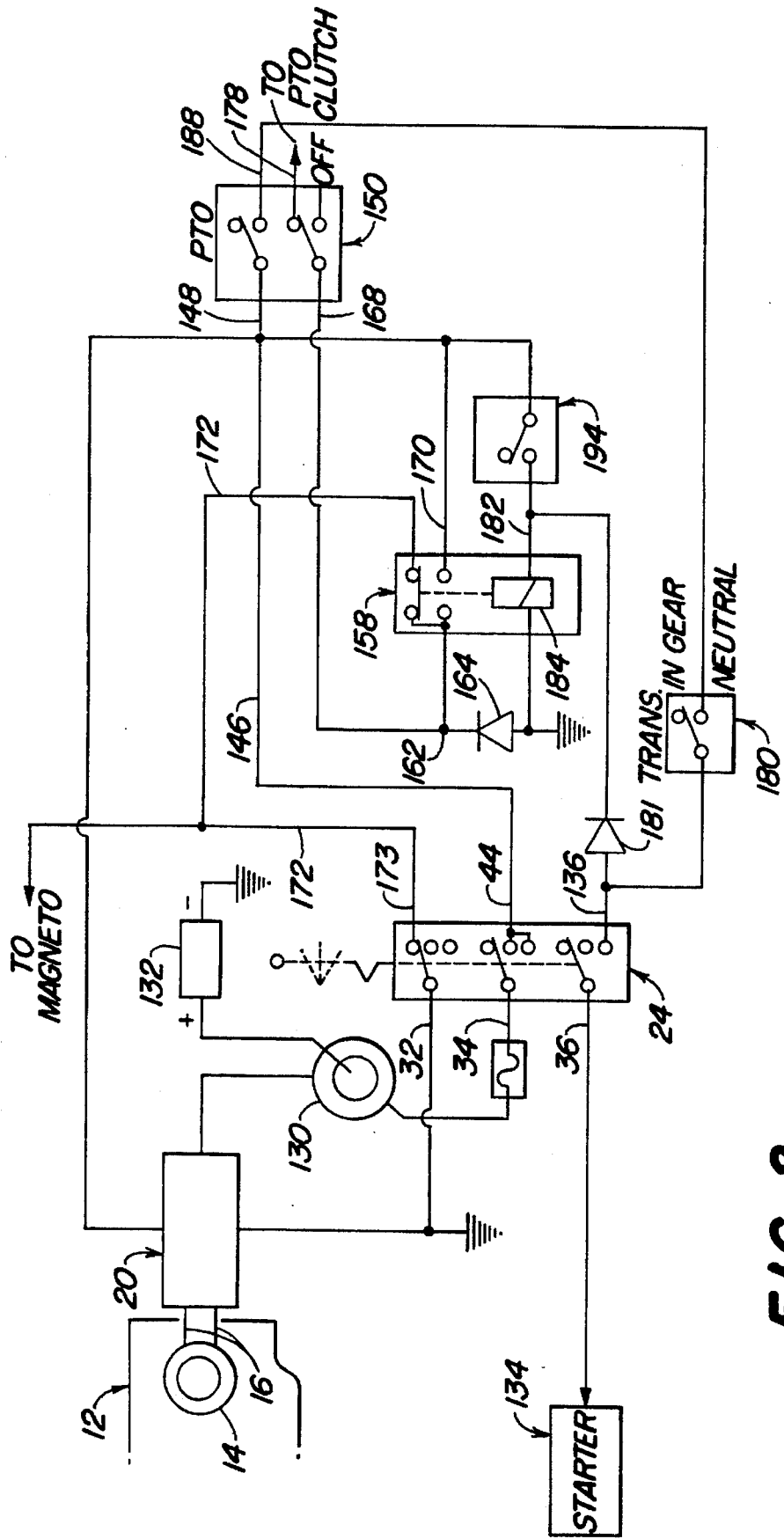
FIG. 2 is a schematic of an interlock circuit similar to that shown in FIG. 1 but for a vehicle with an electric start.

Referring now to FIG. 2, therein is shown a circuit similar to FIG. 1 but for use with a vehicle having an engine 12 with an electric starter 130 and a battery 132. A starter solenoid circuit 134 is connected to the input terminal 36 of the key switch 24. The switched power output terminal 44 is connected by a lead 146 to one input lead 148 of a PTO switch 150. A magneto or ignition relay 158 has a switched output lead 162 connected to a grounding diode 164 and to a second input 168 of the PTO switch 150. A second switched output lead 170 on the relay 158 is connected to the rectifier 20.

The uppermost switched terminal of the relay 158 is connected by a lead 172 to an upper output terminal 173 of the key switch 24 which grounds the lead 172 and the magneto when the key switch is in the off (up) position. The PTO switch 150 includes an output lead 178 connected to the PTO clutch for powering the clutch via the input lead 168 and relay 158 from the lead 170 when the engine is running and the relay 158 is activated (in the down position). A transmission switch 180 is connected to start terminal 136 of the key switch 24. A diode 181 connects the start terminal 136 and switch 180 to an activation coil lead 182 for a coil 184 on the relay 158. The opposite side of the transmission switch 180 is connected to an output terminal 188 on the PTO switch 150 to provide a closed path from the switched power output terminal 44 to the terminal 136 via lead 146, terminals 148,188, and switch 180 when the transmission switch 180 is closed and the PTO switch is off (down).

When the key switch 24 is moved down to the start position with the PTO switch 150 off and the transmission in neutral so the switch 180 is closed, power is supplied to the starter terminal 136 to activate the solenoid circuit 134 and cause the starter 130 to crank the engine. As can be appreciated from FIG. 2, no power can be supplied to the terminal 136 and no cranking of the engine can occur unless the PTO switch 150 is off and the transmission is in neutral so the switch 180 is closed. Current supplied through the diode 181 from the terminal 136 to the activation coil 184 opens the grounding circuit to the magneto to permit the engine to start when the PTO switch is off and the transmission is in neutral.

An operator presence switch 194 is connected between the rectifier 20 and the coil lead 182 to maintain the relay 158 activated and the grounding circuit to the magneto open when the operator is at a preselected location relative to the vehicle so that the transmission may be engaged and the PTO switch turned on without killing the engine. With the operator present so the switch 194 is closed, the circuit between the PTO terminal 148 and the key switch terminal 136 may be opened without affecting the running engine. However, the diode 181 prevents starting of the engine even when the operator is present without first turning off the PTO switch and putting the vehicle in neutral to close the switch 180. Preferably, the switch 194 is bail operated, and if at any time during vehicle operation, the operator releases the bail without first shutting off the PTO switch and putting the transmission in neutral, the relay 158 will deactivate to the position shown in FIG. 2 to ground the magneto through the diode 164 and kill the engine.

Having described the preferred embodiment, it will become apparent that various modifications can be made without departing from the scope of the invention as defined in the accompanying claims.

I claim:

1. In a vehicle having an engine, a source of electrical power, an ignition switch having on and off positions, an electrically engageable power take off (PTO), a PTO switch connected between the source and the PTO, a transmission, and a transmission switch responsive to selection of a neutral condition of the transmission, a selectively engageable transmission clutch, an operator control device operably connected to the transmission clutch and having a released position wherein the transmission is engaged, an interlock circuit comprising:

means connecting the transmission switch and the PTO switch to the ignition switch for permitting starting of the engine when the operator control device is in the released position only when the ignition switch is on and the PTO switch is off and the transmission is in the neutral condition;

an operator presence switch providing an indication of operator presence at a specific location relative to the vehicle; and means connecting the operator presence switch to the transmission switch and the ignition switch for permitting the engine to run with the transmission out of the neutral condition if the indication of operator presence is provided.

2. The invention as set forth in claim 1 wherein PTO switch is connected to the operator presence switch to prevent PTO operation when the operator presence indication is not provided.

3. The invention as set forth in claim 1 wherein the means connecting the operator presence switch includes an ignition relay connected to the key switch and having first and second states wherein the second state prevents engine operation, and an initialization relay connected to the operator presence switch and the ignition relay, the initialization relay maintaining the ignition relay in the first state if the operator presence switch provides the operator presence indication.

4. The invention as set forth in claim 3 further including an electric starter, wherein the ignition switch includes a start position terminal connected to the starter, wherein the PTO and transmission switches provide a current path to the ignition relay and to the starter when the PTO is off, the transmission is in neutral and the ignition switch is in the start position.

5. The invention as set forth in claim 4 wherein the means connecting the transmission switch and the PTO switch to the ignition switch includes a diode having one lead connected to the start position terminal and to the transmission switch and an opposite lead connected to the ignition relay and to the operator presence switch.

6. The invention as set forth in claim 1 wherein the engine comprises a pull start engine, and further including an initialization relay connected to the ignition switch and operator presence switch and preventing killing of the engine when the operator presence indication is provided when the transmission is out of the neutral condition.

7. The invention as set forth in claim 6 further comprising an ignition relay connected to the initialization relay and to the PTO and transmission switches, the ignition relay having an activated state when the engine is running and the PTO is off and the transmission is in the neutral condition.

8. The invention as set forth in claim 7 wherein the PTO switch and the transmission switch are connected in series between the ignition switch and the ignition relay, and wherein the initialization relay and the operator presence switch are connected in series between the ignition switch and the ignition relay.

9. The invention as set forth in claim 8 wherein the ignition relay includes a switched terminal providing a current path from the ignition switch to the PTO switch to engage the PTO when the ignition relay is activated and the PTO switch is on.

10. The invention as set forth in claim 6 wherein the initialization relay has an activated condition and is bootstrapped to the activated condition while the engine is running provided the operator presence indication has been provided.

11. The invention as set forth in claim 1 further comprising an electric starter and a battery, wherein the ignition switch includes a start position and the PTO switch and the transmission switch are connected in series between the ignition switch and the starter when the ignition switch is in the start position.

12. The invention as set forth in claim 11 further comprising an ignition relay and a diode connecting the starter and the ignition relay when the ignition switch is in the start position.

13. The invention as set forth in claim 11 further comprising an ignition relay connected to the source of electrical power via the operator presence switch, the ignition relay enabling engine running when either the PTO switch is off and the transmission is in neutral or the operator presence switch provides the indication of operator presence.

14. The invention as set forth in claim 11 wherein the PTO switch prevents engine operation when the PTO is switch is on and the operator presence indication is not provided.

15. The invention as set forth in claim 11 including means preventing starting of the engine even when the operator indication is present without first turning off the PTO switch and putting the transmission in neutral.

* * * * *